United States Patent
Zheng et al.

(10) Patent No.: US 9,929,763 B1
(45) Date of Patent: Mar. 27, 2018

(54) PROXIMITY SENSOR ARRANGEMENT FOR WIRELESS DEVICES

(71) Applicant: Amazon Technologies, Inc., Seattle, WA (US)

(72) Inventors: Ming Zheng, Cupertino, CA (US); Omar Sze Leung, Palo Alto, CA (US); Jerry Weiming Kuo, San Jose, CA (US); Willy Horng Jean Cheung, Burlingame, CA (US); Michael Serge Devyver, Palo Alto, CA (US); Mudit Sunilkumar Khasgiwala, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/082,556

(22) Filed: Mar. 28, 2016

(51) Int. Cl.
| | |
|---|---|
| *H04B 7/00* | (2006.01) |
| *H04B 1/3827* | (2015.01) |
| *H04M 1/725* | (2006.01) |
| *H04W 52/28* | (2009.01) |
| *H04W 52/34* | (2009.01) |

(52) U.S. Cl.
CPC ...... *H04B 1/3838* (2013.01); *H04M 1/72569* (2013.01); *H04W 52/283* (2013.01); *H04W 52/34* (2013.01)

(58) Field of Classification Search
CPC ..... H04L 31/3838; H04B 1/04; G06F 1/3231; G06F 1/3234; G06F 1/3278; H01Q 1/243; H04M 1/04; H04W 52/245; H04W 52/367; Y02B 60/126; Y02B 60/1289
USPC ... 455/41.1, 41.2, 69, 522, 90.2, 566, 550.1, 455/575.3, 575.5, 90.3; 370/326, 338; 361/679.08, 679.01; 342/372
See application file for complete search history.

(56) References Cited

U.S. PATENT DOCUMENTS

| | | | |
|---|---|---|---|
| 8,967,376 B1* | 3/2015 | Lewbel | B65D 85/00 206/320 |
| 9,172,134 B2 | 10/2015 | McCaughey et al. | |
| 9,374,655 B1* | 6/2016 | Lee | H04W 4/023 |
| 9,612,625 B2* | 4/2017 | Oliver | G06F 1/1677 |
| 2008/0151978 A1* | 6/2008 | Hirota | H04B 1/0057 375/222 |
| 2013/0335904 A1* | 12/2013 | Griffin | G06F 1/1626 361/679.08 |
| 2014/0159957 A1* | 6/2014 | Kasher | H01Q 3/00 342/372 |
| 2014/0265762 A1* | 9/2014 | Murphy | B23P 19/00 312/223.1 |

(Continued)

*Primary Examiner* — Tan H Trinh
(74) *Attorney, Agent, or Firm* — Pierce Atwood LLP

(57) ABSTRACT

Systems and methods for addressing an inadvertent decrease in transmission energy/power due to triggering a proximity sensor by a cover disposed on a computing device. In an embodiment, a cover sensor may be incorporated into the device. The cover sensor may be used to detect the presence of a cover on the device, as well as whether the cover is in an open or closed position. The output of the cover sensor may then be used to adjust a trigger/proximity threshold of the proximity sensor to account for the presence and position of the cover on the device. In this manner the device may avoid unnecessary power backoff caused by proximity of the cover, rather than proximity of the user. This improves the over the air (OTA) performance of the device, as well as the user experience.

16 Claims, 12 Drawing Sheets

(56) References Cited

U.S. PATENT DOCUMENTS

| | | | | |
|---|---|---|---|---|
| 2014/0268517 A1* | 9/2014 | Moon | ............... | H05K 7/00 |
| | | | | 361/679.01 |
| 2014/0306553 A1* | 10/2014 | Lee | ............... | G06F 1/3231 |
| | | | | 307/326 |
| 2014/0315592 A1* | 10/2014 | Schlub | ............ | H04B 1/3838 |
| | | | | 455/522 |
| 2014/0342663 A1* | 11/2014 | Eaton | ............. | H04M 1/04 |
| | | | | 455/41.1 |
| 2015/0169010 A1* | 6/2015 | Shin | ............... | H04M 1/185 |
| | | | | 361/679.27 |
| 2015/0200444 A1* | 7/2015 | Mercer | .......... | H01B 19/00 |
| | | | | 343/702 |
| 2015/0270734 A1* | 9/2015 | Davison | ......... | H02J 7/0054 |
| | | | | 320/103 |
| 2015/0346900 A1* | 12/2015 | Wang | ............. | G06F 1/16 |
| | | | | 345/174 |
| 2015/0372721 A1* | 12/2015 | Bard | .............. | H04B 5/0075 |
| | | | | 455/575.8 |
| 2016/0259378 A1* | 9/2016 | Oliver | ........... | G09G 5/38 |
| 2016/0269999 A1* | 9/2016 | Hwang | .......... | G01D 21/00 |
| 2016/0286543 A1* | 9/2016 | Putterman | ..... | H04W 76/021 |
| 2017/0005703 A1* | 1/2017 | Junk | ............. | H04B 5/0043 |
| 2017/0026498 A1* | 1/2017 | Goldfain | ....... | A45C 11/182 |
| 2017/0047960 A1* | 2/2017 | Kil | ................ | H04B 1/3888 |
| 2017/0093229 A1* | 3/2017 | Sindia | ........... | H02J 50/60 |
| 2017/0126267 A1* | 5/2017 | Park | ............. | H04B 1/3888 |
| 2017/0164293 A1* | 6/2017 | Hwang | .......... | H04W 52/0274 |
| 2017/0205280 A1* | 7/2017 | Debates | ......... | G01J 1/42 |

\* cited by examiner

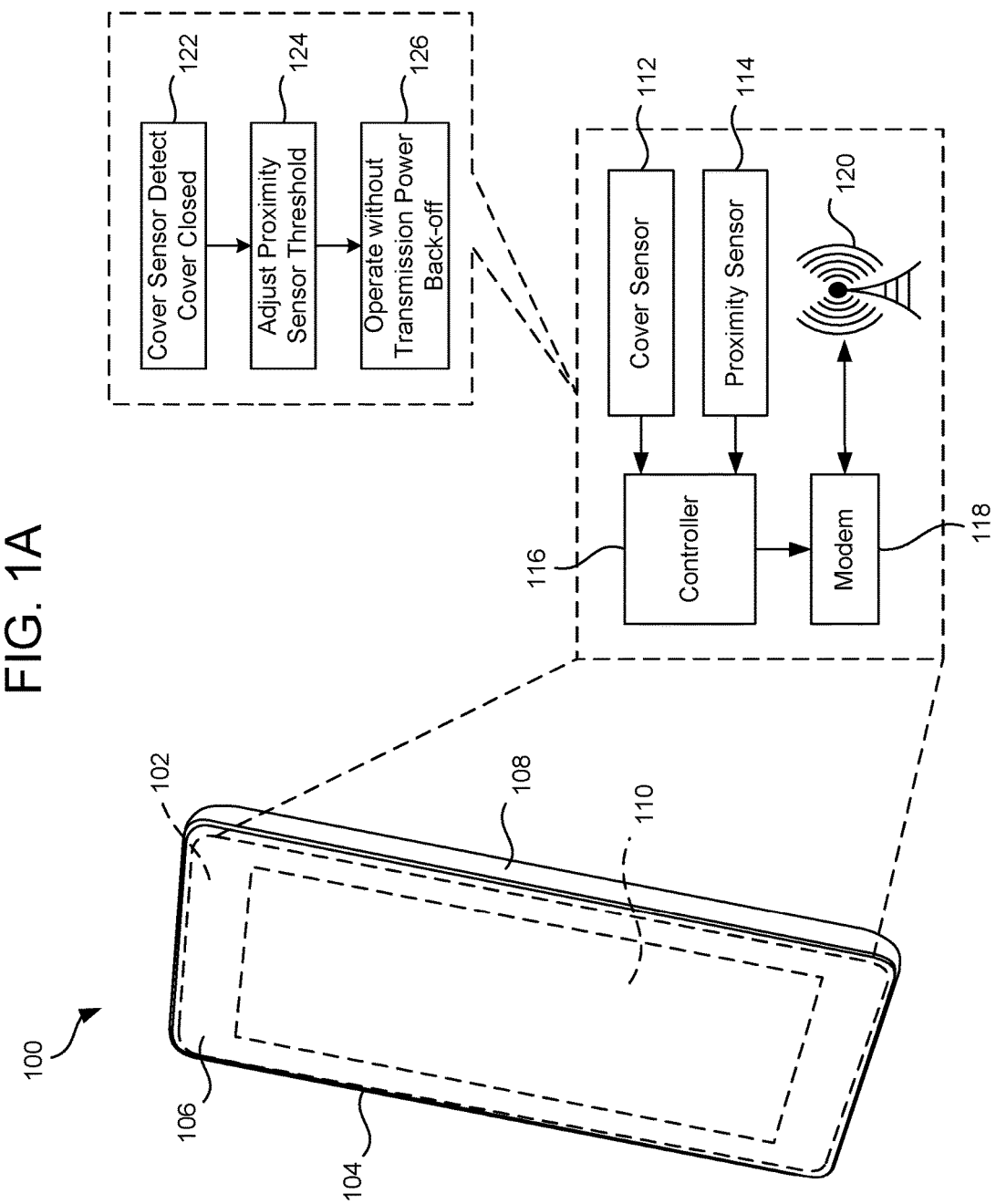

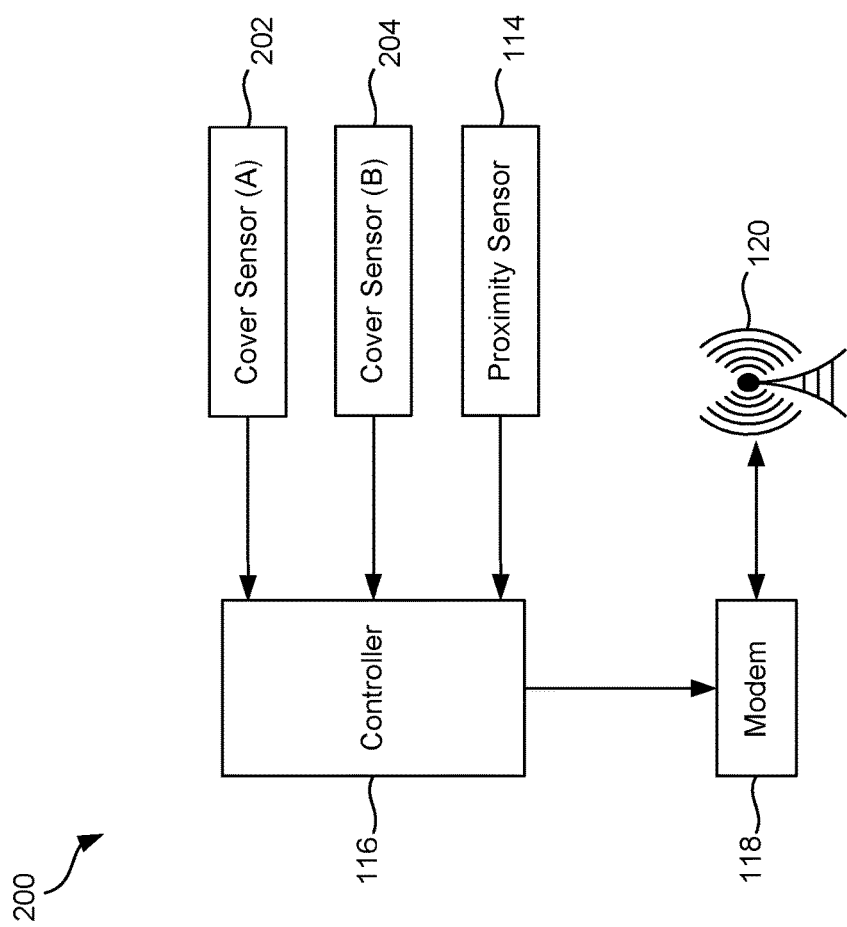

FIG. 3

| Configuration | Cover Sensor (A) 202 | Cover Sensor (B) 204 | Proximity Sensor Threshold |
|---|---|---|---|
| No Cover / Cover Open and not Folded Back | No Signal | No Signal | Low |
| Cover Closed | Detection Signal | Detection Signal | High |
| Cover Open and Folded Back | No Signal | Detection Signal | Medium |
| Unknown Cover | Detection Signal | No Signal | Low |

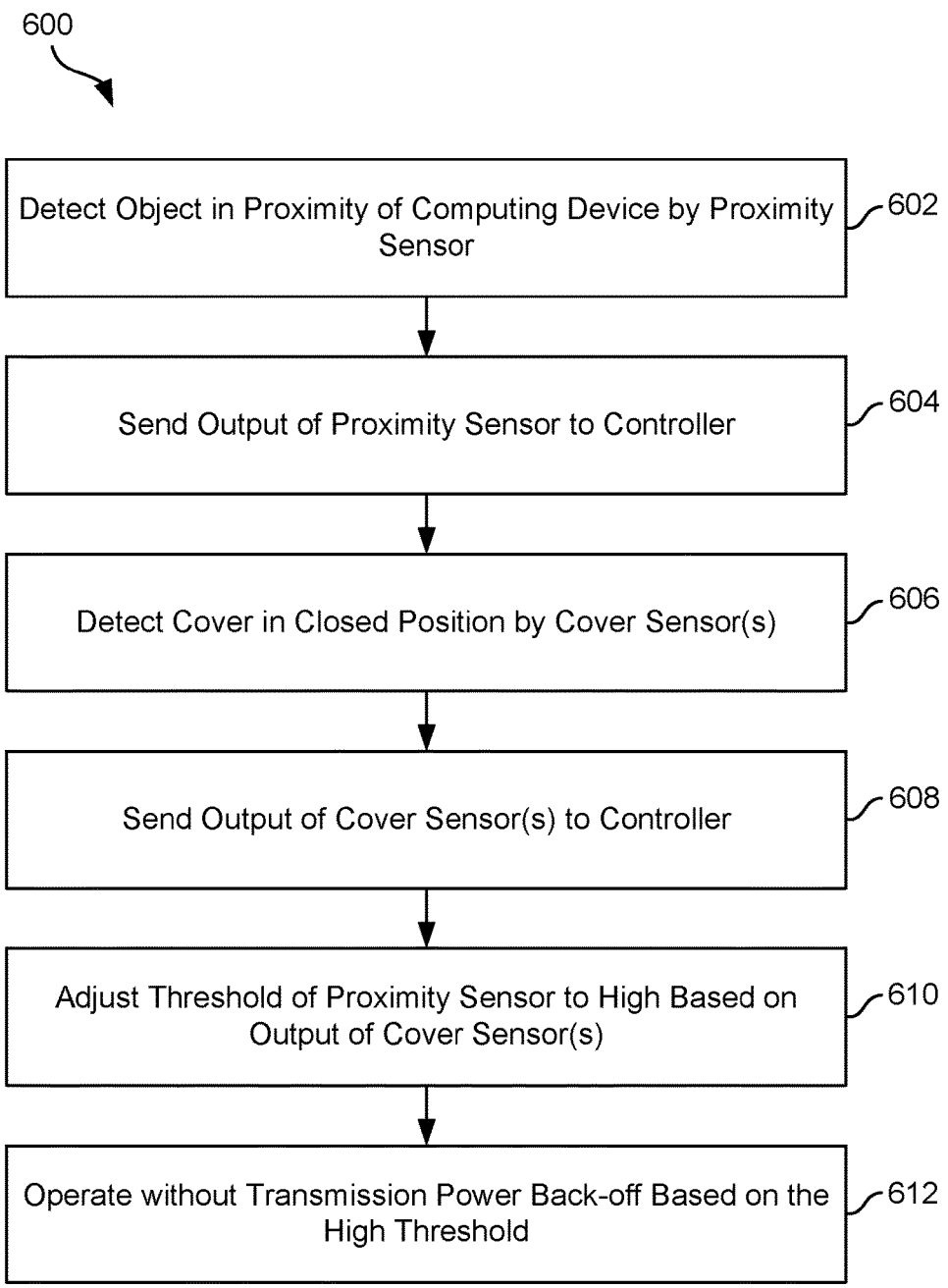

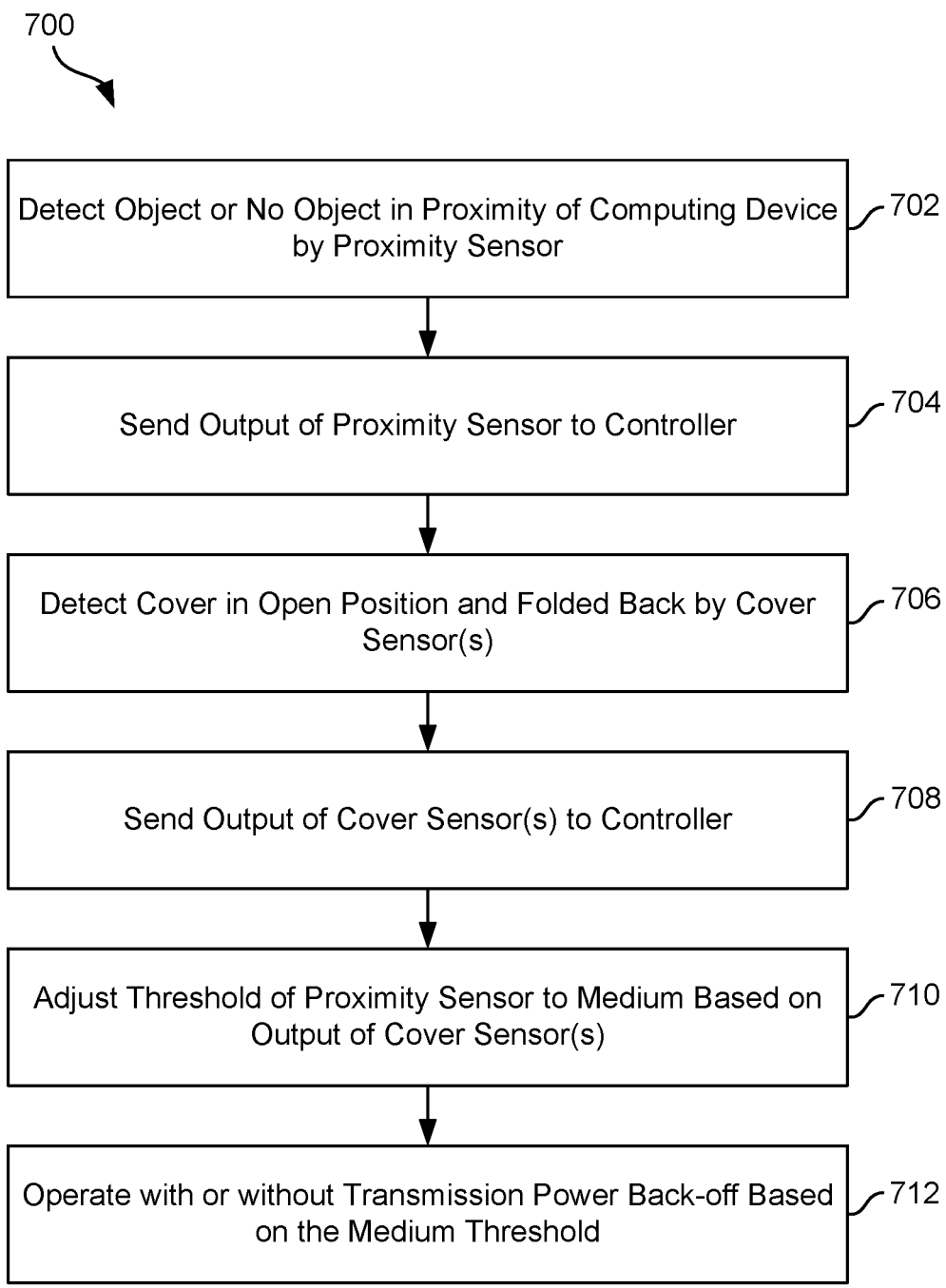

PROXIMITY SENSOR ARRANGEMENT FOR WIRELESS DEVICES

BACKGROUND

The increasing use of wireless communication links between a large variety of devices has led to numerous advancements in antenna design. Mobile electronic devices such as cellular telephones and tablet computers communicate wirelessly in a number of different frequency bands that are specified in various industry standards. A variety of antenna designs are incorporated in such devices to facilitate communication on one or more frequency bands, in accordance with the standards. Mobile electronic devices may include multiband antenna configurations that facilitate communication on more than one frequency band.

BRIEF DESCRIPTION OF DRAWINGS

For a more complete understanding of the present disclosure, reference is now made to the following description taken in conjunction with the accompanying drawings.

FIGS. 1A and 1B illustrate a conceptual overview of a system for adjusting a transmission energy/power based on a position of a device cover according to embodiments of the present disclosure.

FIG. 2 illustrates a functional block diagram of an arrangement of cover sensors according to embodiments of the present disclosure.

FIG. 3 illustrates a table of the various states of the cover sensors according to embodiments of the present disclosure.

FIG. 6 illustrates a block flow diagram of a method for adjusting a threshold of a proximity sensor based on a cover being in a closed position according to embodiments of the present disclosure.

FIG. 7 illustrates a block flow diagram of a method for adjusting a threshold of a proximity sensor based on a cover being in an open position according to embodiments of the present disclosure.

Figure 1B:
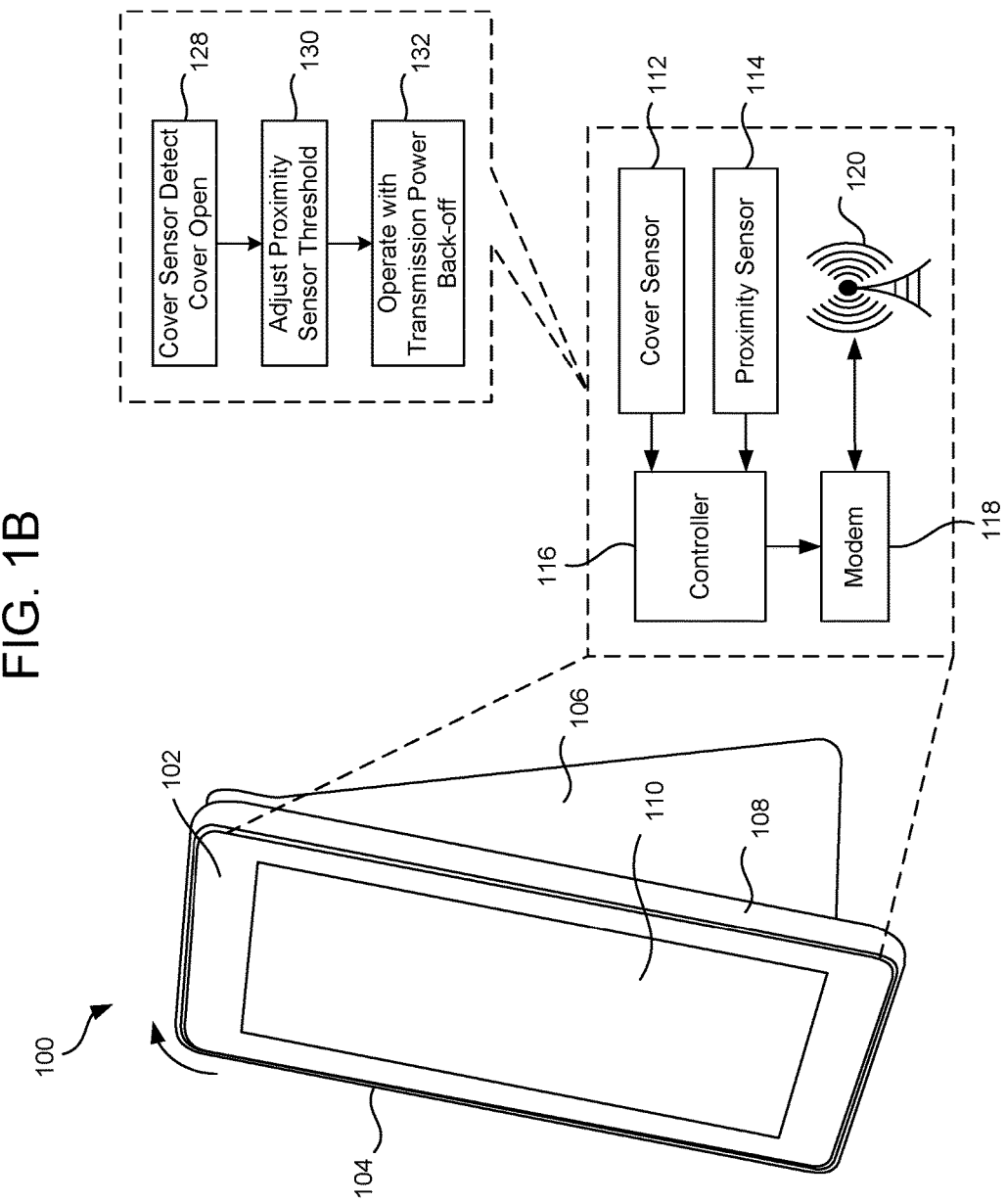

Unless stated otherwise, the figures are not drawn to scale and the relative sizes of features are not proportional.

DETAILED DESCRIPTION

Wireless computing devices typically include a proximity sensor to control the device's radio frequency (RF) transmit power to meet the specifications of regulatory entities, such as the Federal Communications Commission (FCC) Specific Absorption Rate (SAR) specifications in the United States of America and the CENELEC (the European Committee for Electrotechnical Standardization) SAR specifications. SAR is a measure of the rate at which RF energy is absorbed by the human body. SAR provides a means for measuring the RF exposure characteristics of cellular telephones and other wireless devices to ensure that they are within the safety guidelines set by regulatory agencies, such as the FCC.

One drawback with using a proximity sensor to control transmission power (and ultimately SAR exposure) is that when a device cover is attached to the wireless computing device. For example, the device cover may include a first portion that can be folded between a closed position in which the first portion is disposed over and covers a display of the computing device, and an open position in which the first portion is removed from covering the display and folded behind the computing device proximate to a second portion attached to a back of the computing device. When the first portion of the cover is in the closed position and covers the display of the computing device, the cover triggers the proximity sensor, thus triggering a transmission power back-off (i.e., a lowering of the transmission power to meet SAR specifications), even if a user is not close enough to the antenna to warrant the transmission power back-off. In essence, the proximity sensor cannot distinguish between human tissue and the device cover. Thus, the proximity sensor detects the device cover as if the user's head or other body part were near the wireless computing device when it is actually not. This causes the computing device to decrease the transmission power back-off (also referred to as a decrease in transmission power) in accordance with the applicable SAR specifications, resulting in an unnecessarily smaller coverage area and lower throughput.

To address this inadvertent transmission power back-off and improve the over the air (OTA) performance, a cover sensor may be incorporated into the computing device. The cover sensor may be used to detect the presence of a device cover on the computing device, as well as whether the device cover is in an open or closed position, and adjust the trigger/activation threshold (also referred to as a proximity threshold) of the proximity sensor to account for the presence and position of the device cover. Thus, the device may avoid taking SAR reducing measures when only the cover, rather than the user's body, is proximate to or covering the display of the device.

Typically, the proximity sensor works with a default trigger threshold that is set in accordance with the SAR specifications. When a device cover is not installed on the computing device, the cover sensor does not detect a device cover and provides no data or output. On the other hand, when a device cover is installed on the computing device, the cover sensor generates a data signal indicating the presence of the device cover and whether the device cover is in the open or closed position. The output of the cover sensor and the output of the proximity sensor are sent to a controller (which may be a processor, an integrated circuit, etc.), which adjusts the threshold of the proximity sensor to account for the presence and position of the device cover. Although the device cover causes the reading of the proximity sensor to increase when the device cover is closed, the output of the cover sensor and adjusted threshold causes the computing device to refrain from triggering the transmission power back-off.

In an example, the proximity sensor is a capacitance sensor. Thus, when there is no cover on the computing device, the computing device determines that a first capacitance from the proximity sensor of the computing device is within a first capacitance threshold, and operates an antenna of the computing device using a first transmission power. Later, when the cover is placed on the computing device, the device detects the cover and whether the cover is in the open or closed position. When the cover is in the closed position, the computing device receives a first voltage output from the first magnetic sensor, and a second voltage output from the second magnetic sensor. The computing device then determines the cover is in the closed position based on receiving the first voltage output and the second voltage output. When the cover is in the closed position, the computing device activates a second capacitance threshold, the second capacitance threshold being greater than the first capacitance threshold (when there was not cover and the user was using the device). Thus, the computing device determines a second capacitance using the proximity sensor, the second capacitance resulting from the cover being in the closed position; and that the second capacitance is less than the second capacitance threshold. The computing device therefor operates using a second transmission power greater than the first transmission power.

FIGS. 1A and 1B illustrate a conceptual overview of a system 100 for adjusting the transmission power back-off when a device cover is present according to embodiments of the present disclosure. The system 100 includes a computing device 102 and a cover 104. The cover 104 includes a first portion 106 and a second portion 108. The first portion 106 may rotate or be folded between a closed position (as illustrated in FIG. 1A) in which the first portion 106 is disposed over and covers a display 110 of the computing device 102 and an open position (as illustrated in FIG. 1B) in which the first portion 106 is removed from covering the display 110 and folded behind the computing device 102 proximate to the second portion 108. The second portion 108 may be disposed on and coupled to a rear of the computing device 102. Although illustrated as having a "hinge" on the vertical side of the device and being large enough to cover the entire face of the display 110, the cover 104 may be configured in any number of ways to alternate between a closed position and an open position in accordance with the disclosed embodiments.

The computing device 102 may include a cover sensor 112, a proximity sensor 114, a controller 116, a modem 118, and an antenna 120. The cover sensor 112 may be a magnetic based sensor (such as a Hall effect sensor), an infrared camera based sensor, an ambient light sensor, etc. When the cover sensor 112 is a magnetic based sensor, the cover 104 may include a magnet (or some other metallic component) that interacts with the cover sensor 112 to allow the cover sensor 112 to detect the presence of the cover 104, as well as whether the cover 104 is in the open or closed position. When the cover sensor 112 is an infrared camera based sensor or an ambient light sensor, the cover sensor 112 may detect whether the cover 104 is in the open or closed position based on the amount of light detected (i.e., low light may correspond to the cover 104 being in the closed position and an increase in light may correspond to the cover 104 being in the open position).

The proximity sensor 114 may be a capacitive sensor, an infrared based sensor, an ultrasonic sensor, etc. The proximity sensor 114 detects the presence of an object with respect to the computing device 102. The proximity sensor 114 may also be configured with trigger thresholds in accordance with the applicable SAR specifications.

The controller 116 may be a processor, an integrated circuit (such as a system on a chip (SOC)), etc. The controller 116 may receive output from the cover sensor 112 and the proximity sensor 114, and determine whether a transmission power back-off should be implemented (or increased or decreased) by the modem 118 and antenna 120.

As illustrated in FIG. 1A, the cover 104 is in the closed position in which the first portion 106 is disposed over and covers the display 110 of the computing device 102. As described above, the proximity sensor 114 cannot distinguish between human tissue and the cover 104. Thus, the proximity sensor 114 detects the cover 104 (as if the user's head or other body part were near the computing device 102 when it is actually not). This may cause the computing device 102 to operate with a transmission power back-off in accordance with the applicable SAR specifications, resulting in a smaller coverage area and lower throughput.

To address this inadvertent transmission power back-off and improve OTA performance, the computing device 102 includes the cover sensor 112. When the cover 104 is in the closed position, the cover sensor 112 detects the presence of the first portion 106 of the cover 104 covering the display 110, illustrated as block 122, and sends a signal to the controller 116. The controller 116 also receives a signal from the proximity sensor 114 indicating a presence of an object (in this case the first portion 106 of the cover 104). The computing device 102 uses the output signals from the cover sensor 112 and the proximity sensor 114, and adjusts the threshold corresponding to the proximity sensor 114 based on the output of the cover sensor 112, illustrated as block 124. When the cover 104 is in the closed position, even though the cover 104 causes the output of the proximity sensor 114 to increase, the output of the cover sensor 112 and the adjusted threshold causes the computing device 102 to disregard the output of the proximity sensor 114 and operate without a transmission power back-off, illustrated as block 126.

Referring to FIG. 1B, the first portion 104 of the cover 104 is in the open position and is folded behind the computing device 102. In this position, the proximity sensor 114 may not detect the cover 104 (since the cover 104 is open), and instead be able to detect human tissue (such as a part of the user). Thus, the computing device 102 may operate with or without the transmission power back-off in accordance with the applicable SAR specifications based on the output of the proximity sensor 114.

To detect that the cover 104 is in the open position, the cover sensor 112 may detect the presence of the first portion 106 of the cover 104 as being behind the computing device 102, illustrated as block 128. In this situation, the cover sensor 112 sends a signal to the controller 116 indicative of the first portion 106 of the cover 104 being behind the computing device 102. The computing device 102 uses the output signals from the cover sensor 112 and the proximity sensor 114, and adjusts the threshold corresponding to the proximity sensor 114 based on the output of the cover sensor 112, illustrated as block 130. When the cover 104 is in the open position, the output of the cover sensor 112 and the adjusted threshold may cause the computing device 102 to operate with a transmission power back-off (as compared to when the cover 104 is in the closed position), illustrated as block 132. The computing device 102 may operate with the transmission power back-off because, the cover 104 being in the open position may indicate that the computing device 102 is in use by the user and the user is likely in close proximity to the computing device 102. The proximity of the user may also be detected by the proximity sensor 114 and the computing device 102 may further increase the transmission power back-off when the proximity sensor 114 detects that the computing device 102 is in close proximity to the user's head, etc. in accordance with the SAR specifications.

In some embodiments, the computing device may include more than one cover sensor. FIG. 2 illustrates a functional block diagram 200 of an arrangement of cover sensors according to embodiments of the present disclosure. As illustrated, the computing device may include the proximity sensor 114, the controller 116, the modem 118, the antenna 120, a first cover sensor A 202, and a second cover sensor B 204. The cover sensor A 202 may be positioned within the computing device and detect when the cover is in the closed position. For example, the cover sensor A 202 may provide an output signal when the cover is in the closed position and the first portion of the cover is covering the display of the computing device. Similarly, the cover sensor B 204 may be positioned within the computing device and detect when the cover is in the open position and the closed position. For example, the cover sensor B 204 may provide an output signal when the cover is in the closed position and the first portion of the cover is covering the display of the computing device, and an output signal when the cover is in the open position and the first portion of the cover is folded behind the computing device.

FIG. 3 illustrates a table 300 of the various states of the cover sensors according to embodiments of the present disclosure. As illustrated in table 300, when no cover is present on the computing device or the first portion of the cover is partially open (meaning that the first portion is not folded behind the computing device), the cover sensor A 202 and the cover sensor B 204 provide no output signal, and the proximity sensor threshold remains in a low state. In the low state, the computing device may operate with or without a transmission power back-off in accordance with the SAR specifications. When a cover is present on the computing device and in the closed position in which the first portion of the cover is covering the display of the computing device, the cover sensor A 202 and the cover sensor B 204 provide output signals, and the proximity sensor threshold is adjusted to a high state. In the high state, the computing device may operate without a transmission power back-off, even though the proximity sensor may output a high reading due to detection of the cover being closed.

When a cover is present on the computing device and in the open position in which the first portion of the cover is folded behind the computing device, the cover sensor A 202 provides no output signal, the cover sensor B 204 provides an output signal, and the proximity sensor threshold is adjusted to a medium state. In the medium state, the computing device may operate without a transmission power back-off or with a low transmission power back-off (as compared to the low state) because the computing device is likely in use, but may not be directly proximate a user's head or other body part. The cover above may be a cover that includes components that are detectable by the cover sensors A and B when the cover is in the open or closed position to cause the cover sensors A and B to provide the outputs described above, as described in further detail below.

When an unknown cover (as opposed to the cover that includes components that are detectable by the cover sensors A and B) is present, the cover sensors A and B may be able to detect magnetic forces generated by the unknown cover. For example, the unknown cover may include one or more magnets that couple a front portion of the cover to the back portion when in an open position in which the front portion is folded behind the computing device, and the front portion to the back portion when in a closed position in which the front portion is placed over the display of the computing device. In this situation, the magnetic forces generated by the magnets may be detectable by cover sensors A or B. As illustrated in table 300, the cover sensor A 202 may output a detection signal while the cover sensor B 204 outputs no signal. In this situation, the proximity sensor threshold may remain in the low state, and the computing device may operate with or without a transmission power back-off in accordance with the SAR specifications.

In an example, the low, medium and high states of the proximity sensor threshold may be capacitive values or a number of counts that are ratios of one another. For example, the low, medium and high states may be set to a ratio of 1:2:3. In this example, the number of counts of the low, medium and high states may correspond to 100, 200, and 300, respectively. It should be appreciated that the low, medium and high states may be configured as other ratios and have other corresponding values.

Figure 4A:
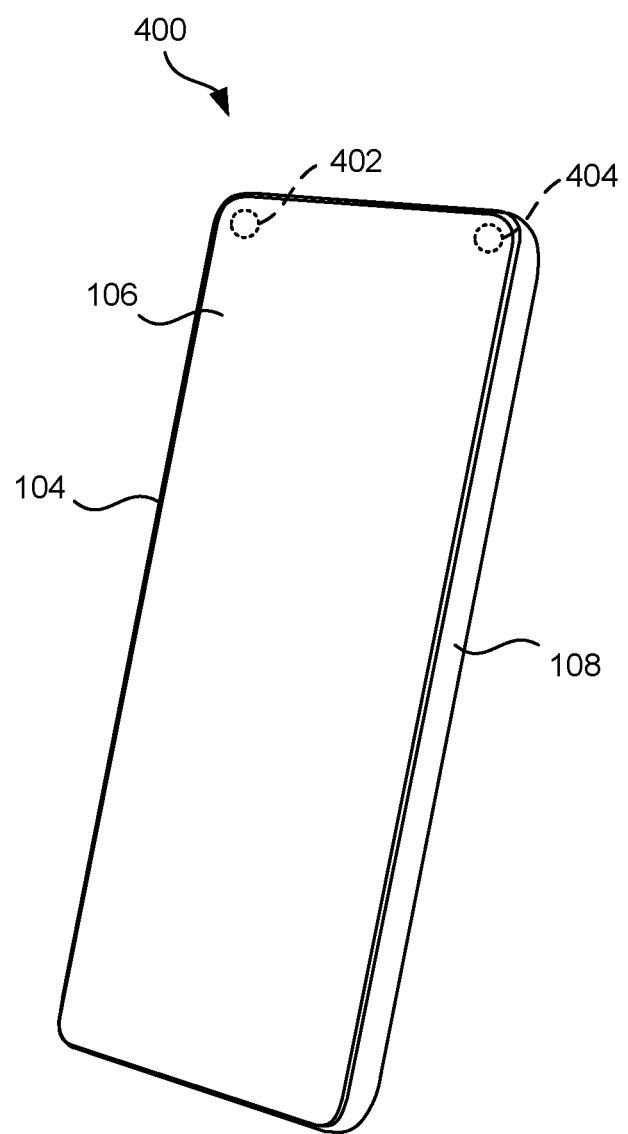
FIGS. 4A and 4B illustrate a system of a computing device and cover in accordance with embodiments of the present disclosure.
Figure 4B:
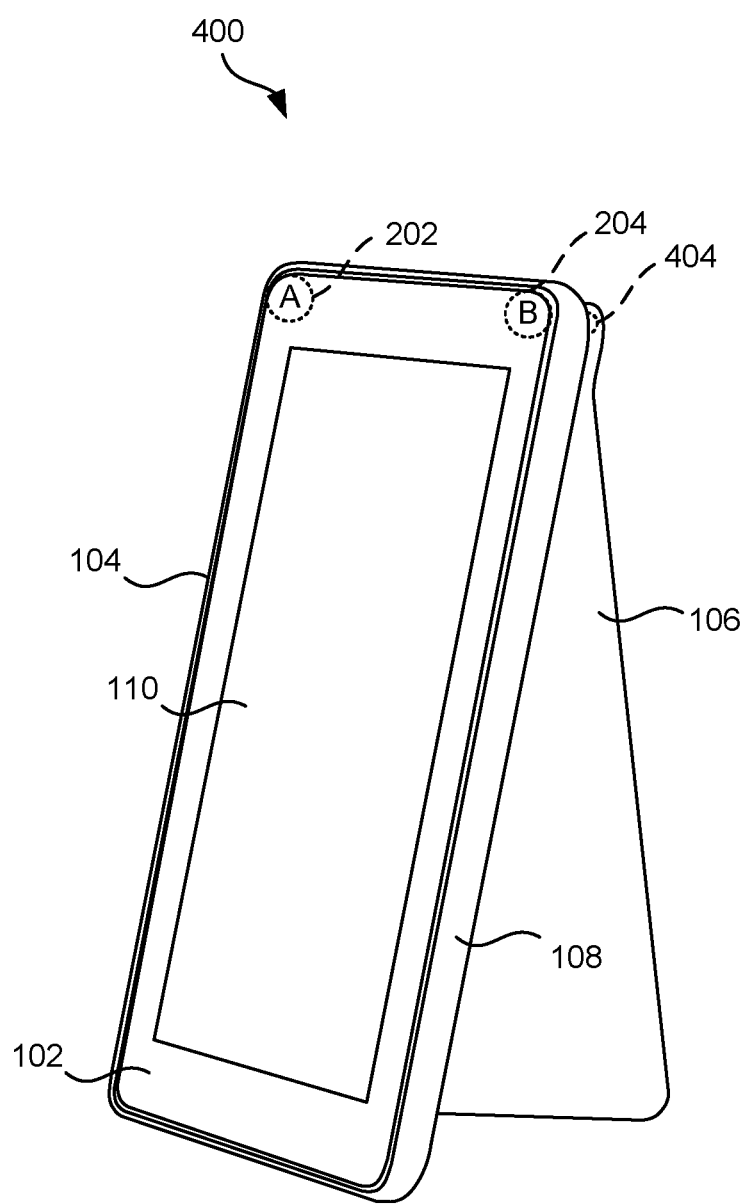

FIGS. 4A and 4B illustrate a system 400 of a computing device and cover in accordance with embodiments of the present disclosure. As illustrated in FIG. 4A, the cover 104 may include a first magnet 402 in the first portion 106 positioned in an upper left corner of the first portion 106, and a second magnet 404 in the first portion 106 positioned in an upper right corner of the first portion 106. Similarly, as illustrated in FIG. 4B, the computing device 102 may include the first cover sensor A 202 positioned in an upper left corner, and the second cover sensor B 204 positioned in an upper right corner.

Referring to FIGS. 4A and 4B, in an aspect, the first magnet 402 and first cover sensor A 202 may be directionally oriented to allow the first cover sensor A 202 to detect a magnetic force or field generated by the first magnet 402 when the cover 104 is in the closed position (as illustrated in FIG. 4A). In this aspect, the first magnet 402 and first cover sensor A 202 may be aligned with one another when the cover 104 is in the closed position. Further, the first cover sensor A 202 may not detect the first magnet 402 when the cover 104 is in the open position and the first portion 106 is folded behind the computing device 102 (as illustrated in FIG. 4B).

In a similar manner, the second magnet 404 and second cover sensor B 204 may be directionally oriented to allow the second cover sensor B 204 to detect a magnetic force or field generated by the second magnet 404 when the cover 104 is in the closed position (as illustrated in FIG. 4A) or the open position (as illustrated in FIG. 4B). For example, when the cover 104 is in the closed position, the second magnet 404 is aligned with the cover sensor B 204. Similarly, when the cover 104 is in the open position and the first portion 106 is folded behind the computing device 102, the second magnet 404 is aligned with the cover sensor B 204, but the second magnet 404 is positioned behind the second portion 108 of the cover 104. Thus, when the cover 104 is installed on the computing device 102, the second cover sensor B 204 provides an output signal when the cover 104 is in the open position in which the first portion 106 is folded behind the computing device 102 and the closed position in which the first portion 106 is disposed over the display 110 of the computing device 102, as identified in FIG. 3.

In the example of FIGS. 4A and 4B, the first cover sensor A 202 and the second cover sensor B 204 may be Hall effect sensors that vary their output voltage signals in response to detection of a magnetic field. When no magnetic field is detected, the first cover sensor A 202 and the second cover sensor B 204 may not output a voltage signal, and when a magnetic field is detected, the first cover sensor A 202 and/or the second cover sensor B 204 may output a non-zero voltage signal. In another example, when no magnetic field is detected, the first cover sensor A 202 and the second cover sensor B 204 may output a voltage low signal, and when a magnetic field is detected, the first cover sensor A 202 and/or the second cover sensor B 204 may output a voltage high signal. These output signals are used by the controller to determine the position of the cover and to adjust the threshold of the proximity sensor as described herein.

While the first cover sensor A 202 and the second cover sensor B 204, and the corresponding first magnet 402 and the second magnet 404 are described as positioned in corners of the computing device 102 and cover 104, respectively, the first cover sensor A 202 and the second cover sensor B 204, and the corresponding first magnet 402 and the second magnet 404 may be positioned in any other location that allows for the functionality described above.

Further, the cover sensor(s) may also be other types of components, such as an infrared camera based sensor, an ambient light sensor, etc. When the cover sensor(s) is an infrared camera based sensor or an ambient light sensor, the cover sensor(s) may detect whether the cover is in the open or closed position based on the amount of light detected (i.e., low light may correspond to the cover being in the closed position; and an increase in light may correspond to the cover being in the open position). For example, the first magnet 402 and the second magnet 404 may be infrared components that are detectable by the first cover sensor A 202 and the second cover sensor B 204 (when the first cover sensor A 202 and the second cover sensor B 204 are infrared sensors).

Figure 5A:
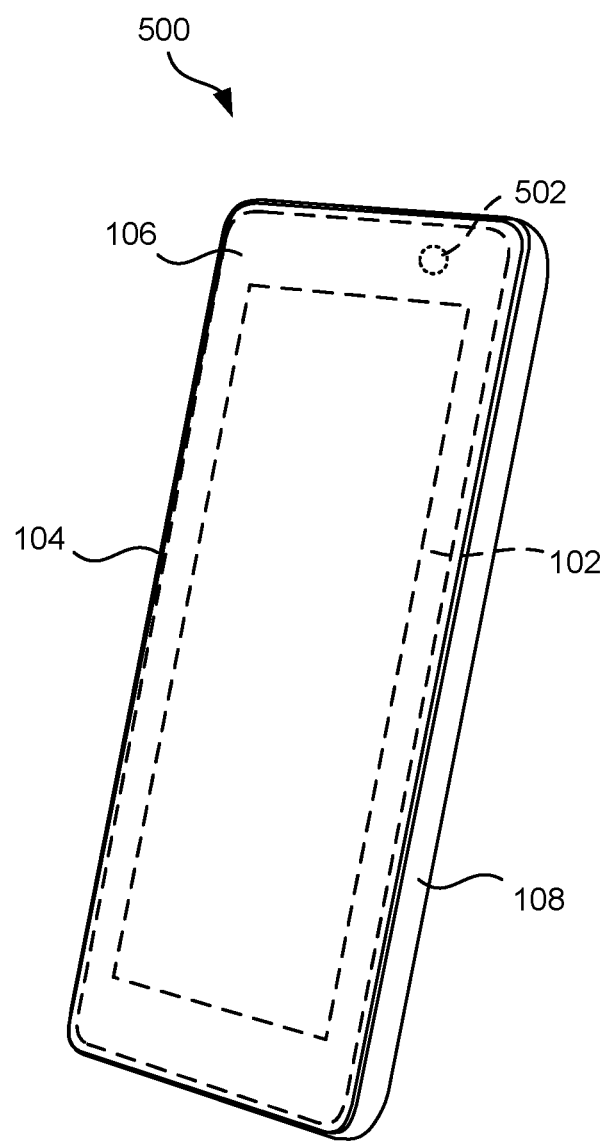
FIGS. 5A and 5B illustrate another system of a computing device and cover in accordance with embodiments of the present disclosure.
Figure 5B:
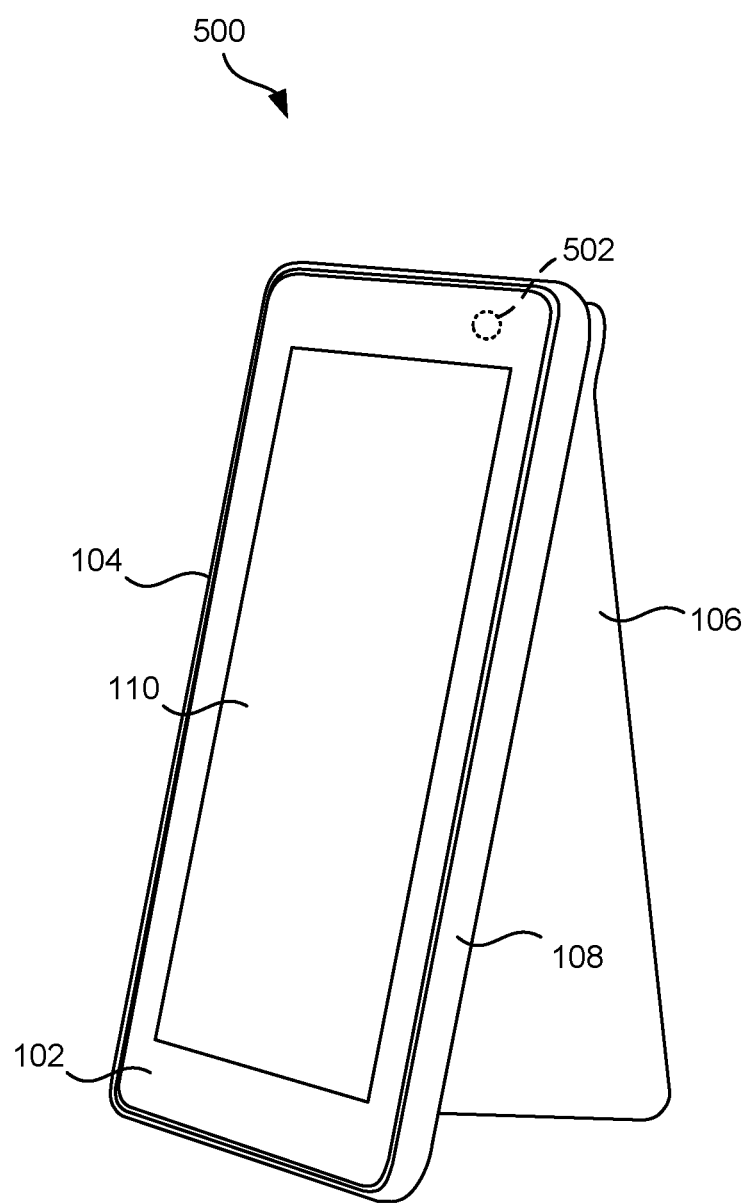

FIGS. 5A and 5B illustrate a system 500 of a computing device and cover in accordance with embodiments of the present disclosure. As illustrated, the computing device 102 may include the cover sensor 502 oriented in a direction of the first portion 106 of the cover 104. In this example, the cover sensor 502 may be an infrared camera based sensor or an ambient light sensor (and the cover sensor may be part of an existing camera or other component of the computing device 102).

Referring to FIG. 5A, when the cover 104 is in the closed position, the first portion 106 may block light, thereby causing the cover sensor 502 to detect that the cover 104 is in the closed position. The first portion 106 may also include an infrared component that aligns with and is detectable by the cover sensor 502 when the cover 104 is in the closed position.

In a similar manner, referring to FIG. 5B, when the cover 104 is in the open position, the first portion 106 may not block light, thereby causing the cover sensor 502 to detect that the cover 104 is in the open position. The first portion 106 may also include the infrared component that is not detectably by the cover sensor 502 when the cover 104 is in the open position, thereby further indicating that the cover 104 is in the open position.

In an example, the cover sensor 502 may be an infrared component that outputs an infrared signal, and the first portion 106 of the cover 104 may include a corresponding reflective surface that aligns with the cover sensor 502 and reflects the infrared signal back to the cover sensor 502 when the cover 104 is in the closed position. Similarly, when the cover 104 is in the open position, the first portion 106 may not reflect the infrared signal back to the cover sensor 502, thereby indicating that the cover 104 is in the open position.

Regardless of the type of cover sensor utilized, the computing device may increase or decrease a threshold of the proximity sensor based on the cover being present and the position of the cover. FIG. 6 illustrates a block flow diagram of a method 600 for adjusting a threshold of a proximity sensor based on the cover being in a closed position (in which the first portion of the cover is disposed over and covers the display of the computing device) according to embodiments of the present disclosure. As illustrated, the proximity sensor may detect an object in proximity of the computing device, illustrated as block 602. In this example, the proximity sensor may be detecting the cover (such as the first portion of the cover) covering the display of the computing device. The proximity sensor may send output corresponding to detection of the object (i.e., the cover) to a controller of the computing device, illustrated as block 604.

As described above, the proximity sensor cannot distinguish between human tissue and the cover. Thus, the proximity sensor detects the cover (as if the user's head or other body part were near the computing device when it is actually not). This can cause the computing device to trigger a transmission power back-off in accordance with the applicable SAR specifications, resulting in a smaller coverage area and lower throughput. However, the cover sensor(s) of the present disclosure address this issue as follows:

In parallel (or series), the cover sensor(s) may detect that the cover is in the closed position, illustrated as block 606. The cover sensor(s) may also send output corresponding to the cover being in the closed position to the controller, illustrated as block 608. For example, as described above with respect to FIGS. 4A and 4B, the cover sensor(s) may detect a magnetic field being generated by magnet(s) in the cover and send output corresponding to detection of the magnet(s) to the controller.

The controller receives the output from the proximity sensor and the cover sensor(s), and adjusts the threshold of the proximity sensor (for example, to a high threshold as illustrated in FIG. 3) based on the output of the cover sensor(s) indicating that the cover is in the closed position, illustrated as block 610. In this situation, the controller may cause the computing device to operate without a transmission power back-off, illustrated as block 612, even though the output of the proximity sensor may be increased. For example, when the cover is in the closed position, the computing device is likely not in use and the user is not likely holding the computing device in close proximity to the user's head. Thus, the output of the cover sensor(s) and the adjusted threshold causes the computing device to essentially disregard the output of the proximity sensor and operate without a transmission power back-off to increase the coverage area and throughput.

FIG. 7 illustrates a block flow diagram of a method 700 for adjusting a threshold of a proximity sensor based on the cover being in an open position (in which the first portion of the cover is folded behind the computing device) according to embodiments of the present disclosure. As illustrated, the proximity sensor may detect an object or may not detect an object in proximity of the computing device, illustrated as block 702. The proximity sensor may send output corresponding to such detection or non-detection of the object to a controller of the computing device, illustrated as block 704.

In parallel (or series), the cover sensor(s) may detect that the cover is in the open position (in which the first portion of the cover is folded behind the computing device), illustrated as block 706. The cover sensor(s) may also send output corresponding to the cover being in the open position to the controller, illustrated as block 708. For example, as described above with respect to FIGS. 4A and 4B, the cover sensor(s) may detect a magnetic field being generated by magnet(s) in the cover and send output corresponding to detection of the magnet(s) to the controller.

The controller receives the output from the proximity sensor and the cover sensor(s), and adjusts the threshold of the proximity sensor (for example, to a medium threshold as illustrated in FIG. 3) based on the output of the cover sensor(s) indicating that the cover is in the open position, illustrated as block 710. In this situation, the controller may cause the computing device to operate with or without a transmission power back-off, illustrated as block 712, even though the output of the proximity sensor may be increased. For example, when the cover is in the open position, the computing device is likely in use, however, the user may or may not be holding the computing device in close proximity to the user's head. Further, the cover may shield or absorb RF energy. Thus, the output of the cover sensor(s) and the adjusted threshold causes the computing device to operate without a transmission power back-off to increase the coverage area and throughput. This allows for higher transmission power when there is a cover on the computing device, since some of the RF energy may be absorbed or shielded by the cover.

Figure 8:
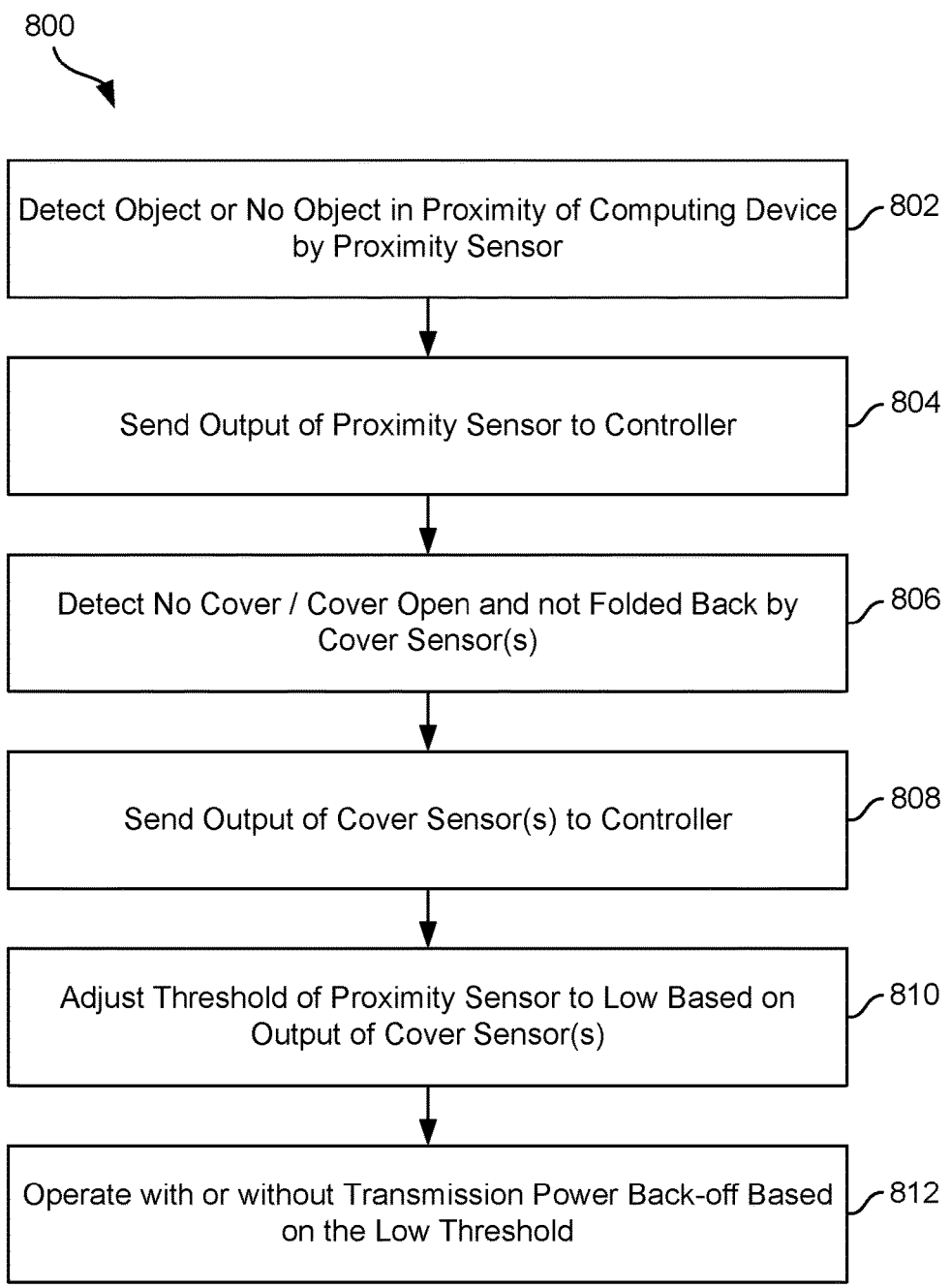
FIG. 8 illustrates a block flow diagram of a method for adjusting a threshold of a proximity sensor based on no cover being detected according to embodiments of the present disclosure.

FIG. 8 illustrates a block flow diagram of a method 800 for adjusting a threshold of a proximity sensor based on no cover being detected or the first portion of the cover being partially open (meaning that the first portion is not folded behind the computing device) according to embodiments of the present disclosure. As illustrated, the proximity sensor may detect an object or may not detect an object in proximity of the computing device, illustrated as block 802. The proximity sensor may send output corresponding to such detection or non-detection of the object to a controller of the computing device, illustrated as block 804.

In parallel (or series), the cover sensor(s) may detect that no cover is present on the computing device or the first portion of the cover partially open, illustrated as block 806. The cover sensor(s) may also send output corresponding to the cover not being present or the first portion of the cover partially open to the controller (which may include sending no signal to the controller), illustrated as block 808.

The controller receives the output from the proximity sensor and the cover sensor(s), and adjusts the threshold of the proximity sensor (for example, to a low threshold as illustrated in FIG. 3) based on the output of the cover sensor(s) indicating that the cover is not present or the first portion of the cover partially open, illustrated as block 810. In this situation, the controller may cause the computing device to operate with now without a transmission power back-off, illustrated as block 812. For example, when the cover is not present, the RF energy may not be shielded or absorbed. Thus, the output of the cover sensor(s) and the adjusted threshold causes the computing device to operate with or without a transmission power back-off in accordance with the SAR specifications.

Figure 9:
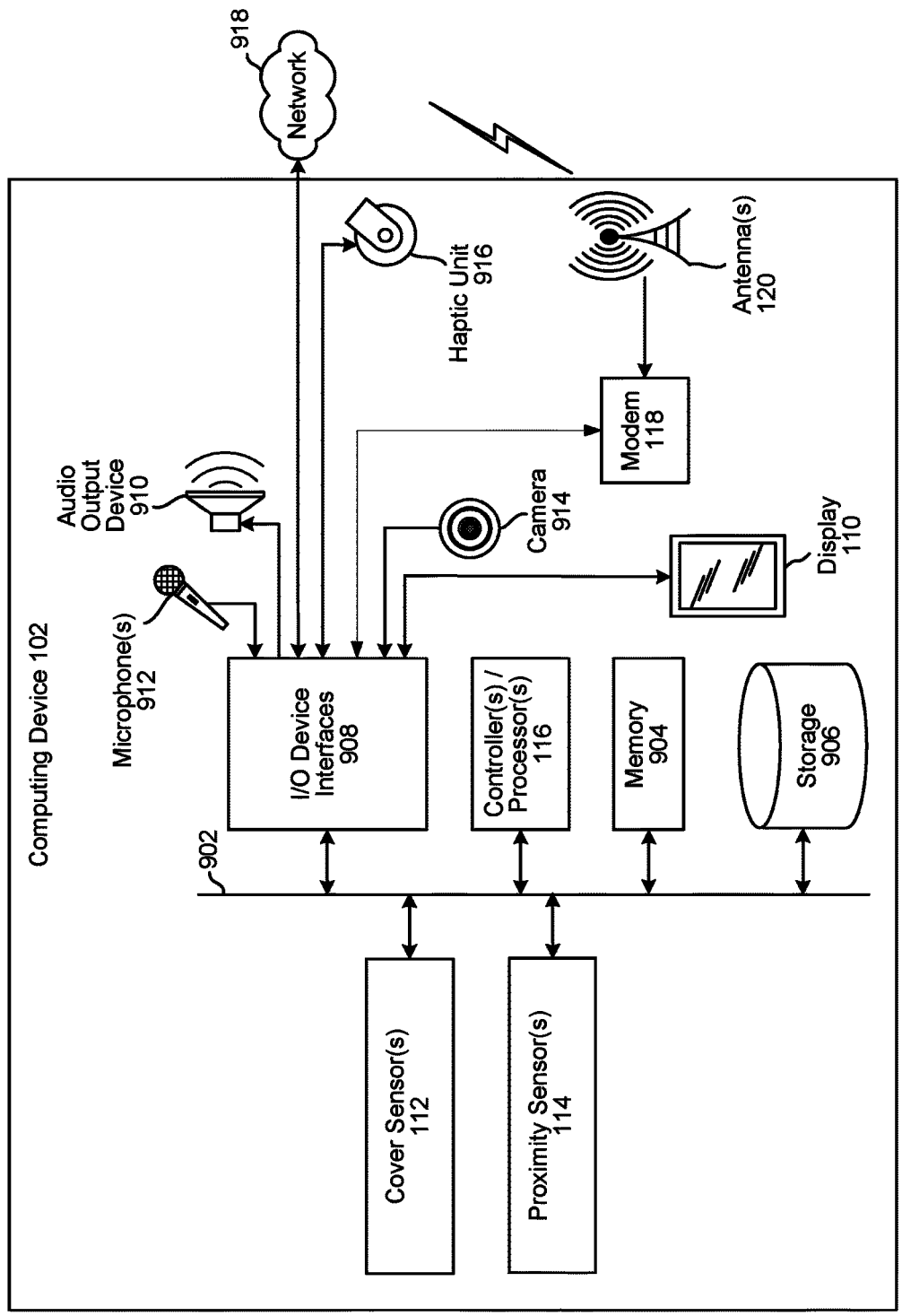
FIG. 9 illustrates a block diagram conceptually illustrating example components of a computing device according to embodiments of the present disclosure.

FIG. 9 is a block diagram conceptually illustrating example components of computing device 102 that may be used with the described system and may incorporate certain aspect of the present disclosure. In operation, the computing device 102 may include computer-readable and computer-executable instructions that reside on the computing device 102, as will be discussed further below.

The computing device 102 may include an address/data bus 902 for conveying data among components of the computing device 102. Each component within the computing device 102 may also be directly connected to other components in addition to (or instead of) being connected to other components across the bus 902.

The computing device 102 may include one or more controllers/processors 116, that may each include a central processing unit (CPU) for processing data and computer-readable instructions, and a memory 904 for storing data and instructions of the respective device. The memory 904 may include volatile random access memory (RAM), non-volatile read only memory (ROM), non-volatile magnetoresistive (MRAM) and/or other types of memory. The computing device 102 may also include a data storage component 906, for storing data and controller/processor-executable instructions. The data storage component 906 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through an input/output device interface 908. The storage component 906 may include storage for various data including the states of the cover sensor(s) described above.

Computer instructions for the computing device 102 and its various components may be executed by the controller(s)/processor(s) 116, using the memory 904 as temporary "working" storage at runtime. The instructions may be stored in a non-transitory manner in non-volatile memory 904, storage 906, or an external device(s). Alternatively, some or all of the executable instructions may be embedded in hardware or firmware on the computing device 102 in addition to or instead of software.

The computing device 102 includes the input/output device interface 908. A variety of components may be connected through the input/output device interface 908, as will be discussed further below. The computing device 102 may include a display 110 having a touch interface. The display 110 may be a display of any suitable technology, such as a liquid crystal display, an organic light emitting diode display, electronic paper, an electrochromic display, a cathode ray tube display, a pico projector or other suitable component(s). The display 110 may also include a touch sensor and/or touch controller for determining, detecting, receiving, and/or obtaining information relating to touch input.

The computing device 102 may also include other components, such as an audio output component such as a speaker 910, a wired headset or a wireless headset (not illustrated), an audio capture component such as a microphone 912, an image/video capture component such as a camera 914, a haptic component 916, etc.

The computing device 102 (using input/output device interfaces 908, antenna(s) 120, etc.) may also be configured to transmit and receive data over a network 918. For example, via the antenna(s) 120, the input/output device interfaces 908 may connect to one or more networks 918 via a wireless local area network (WLAN) (such as WiFi) radio, Bluetooth, infrared (IR), and/or wireless network radio, such as a radio capable of communication with a wireless communication network such as a Long Term Evolution (LTE) network, WiMAX network, 3G network, etc. A wired connection such as Ethernet may also be supported.

The computing device 102 may also include the modem 118, cover sensor(s) 112, and proximity sensor(s) 114. The modem may communicate with the controller(s)/processor(s) 116 and the antenna(a) 120 to provide the appropriate transmission power for the computing device 102 to communicate with the network 918 in accordance with the methods described above. The RF bands used by mobile computing devices start at around 699 MHz. For example, referring to the Long Term Evolution (LTE) Fourth Generation (4G) cellular telephony standard, Low Band (LB) is generally in a range of 699 MHz to 960 MHz (overlapping with the WCDMA and GSM Third Generation cellular radio standards), Mid Band (MB) is generally in a range of 1,710 MHz to 2,170 MHz (also overlapping with WCDMA and GSM), and High Band (HB) is generally in a range of 2,305 MHz to 2,690 MHz. The IEEE 802.11 WiFi wireless local area network (WLAN) standards generally use frequencies around 2,400 MHz and 5,000 MHz, with newer incarnations using even higher frequency bands such as 60,000 MHz (i.e., 60 GHz). The Bluetooth personal area network (PAN) standard also uses frequencies around 2,400 MHz. The WiMAX communications standard (i.e., IEEE 802.16) typically uses frequency bands around 2.3 GHz, 2.5 GHz, and 3.5 GHz. The Global Position System (GPS) navigation satellites broadcast RF signals at around 1,228 MHz and 1,575 MHz, and the GLONASS navigation satellites broadcast at around 1,246 MHz and 1,602 MHz.

The cover sensor(s) 112 may be a magnetic based sensor (such as a Hall effect sensor), an infrared camera based sensor, an ambient light sensor, etc. The cover sensor(s) 112 detect the presence of the cover, as well as whether the cover is in the open or closed position, and provide output to the controller(s)/processor(S) 116. When the cover sensor(s) 112 are magnetic based sensor(s), the cover may include a magnet that interacts with the cover sensor(s) 112 to allow the cover sensor(s) 112 to detect the presence of the cover, as well as whether the cover is in the open or closed position, in accordance with the methods described above. When the cover sensor(s) 112 infrared camera based sensor(s) or an ambient light sensor(s), the cover sensor(s) 112 may detect whether the cover is in the open or closed position based on the amount of light detected (i.e., low light may correspond to the cover being in the closed position; and an increase in light may correspond to the cover being in the open position), in accordance with the methods described above.

The proximity sensor(s) 114 may be capacitive sensor(s), infrared based sensor(s), ultrasonic sensor(s), etc. The proximity sensor(s) 114 detect the presence of an object with respect to the computing device 102 and provide output to the controller(s)/processor(S) 116. The proximity sensor(s) 114 may also be configured with trigger thresholds in accordance with the applicable SAR specifications. These thresholds may be adjusted based on the output of the cover sensor(s) 112, thereby providing an adaptive threshold, in accordance with the methods described above.

The SAR specifications are intended to ensure that a cellular telephone or other wireless computing devices does not exceed the a maximum permissible exposure level even when operating in conditions which result in the device's highest possible (but not its typical) RF energy absorption for a user. Current FCC guidelines require mobile electronic device manufacturers to ensure that the maximum exposure is at or below a SAR level of 1.6 watts per kilogram (1.6 W/kg) with a 1 gram mass.

SAR testing uses standardized models of the human head and body that are filled with liquids that simulate the RF absorption characteristics of different human tissues. In order to determine regulatory compliance, a mobile device is tested while operating at its highest power level in all the frequency bands in which it operates, and in various specific positions against a dummy head and body, to simulate the way different users typically hold a mobile device, such as against each side of the head for a cellular telephone, or held in a hand or placed on a lap for a tablet computer.

To test cellular telephones for SAR compliance, the device is precisely placed in various common positions next to the head and body, and a robotic probe takes a series of measurements of the electric field at specific pinpoint locations in a precise, grid-like pattern within the dummy head and torso. In the United States, the FCC uses the highest SAR value for each frequency band to demonstrate compliance with the FCC's RF guidelines.

It should be appreciated that one or more of the functional components illustrated in and described with reference to FIGS. 1A-5B may perform one or more of the steps of the methods illustrated in and described herein, for example, with reference to FIGS. 6-8.

The above embodiments of the present disclosure are meant to be illustrative. They were chosen to explain the principles and application of the disclosure and are not intended to be exhaustive or to limit the disclosure. The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Various aspects, such as, the cover detection disclosed herein, can be implemented in the computing device. These functions may be implemented in hardware (such as integrated circuits) or software as one or more scripts or programs written in any programming language, such as Java, C, C# or C++, or any scripting language, such as Perl, Python, or TCL, as well as combinations thereof.

Many modifications and variations of the disclosed embodiments may be apparent to those of skill in the art. Persons having ordinary skill in the field of computers should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a magnetic sensor of a computing device, first data corresponding to a first voltage representing a cover of the computing device is in an open position, the cover including a first portion and a second portion, the first portion being coupled to a back of the computing device and the second portion being movable between the open position and a closed position, the second portion being disposed over a display of the computing device while in the closed position;
operating, based at least in part on the first data, an antenna of the computing device using a first transmission power;
receiving second data from a proximity sensor of the computing device, the proximity sensor configured to detect presence of a user;

comparing the second data to a first proximity threshold, the first proximity threshold being configured based at least in part on the first data;
receiving, from the magnetic sensor, third data corresponding to a second voltage representing the cover is in the closed position;
receiving fourth data from the proximity sensor; and
comparing the fourth data to a second proximity threshold, the second proximity threshold being configured based at least in part on the third data.

2. The method of claim 1, wherein the first proximity threshold is less than the second proximity threshold.

3. A method, comprising:
receiving, from a first sensor of a computing device, first data corresponding to a first position of a cover disposed on the computing device;
receiving second data from a proximity sensor of the computing device;
based at least in part on the first data indicating the first position is an open position, comparing the second data to a first proximity threshold;
transmitting a first wireless communication signal at a first transmission power based at least in part on the first proximity threshold;
receiving, from the first sensor, third data corresponding to a second position of the cover;
receiving fourth data from the proximity sensor;
based at least in part on the third data indicating the second position is a closed position, comparing the fourth data to a second proximity threshold, the cover being at least partially disposed over a display of the computing device while in the closed position; and
transmitting a second wireless communication signal at a second transmission power based at least in part on the second proximity threshold.

4. The method of claim 3, wherein the second proximity threshold is greater than the first proximity threshold.

5. The method of claim 3, further comprising:
receiving, from a second sensor of the computing device, fifth data corresponding to the second position; and
based at least in part on the third data and the fifth data indicating the second position is the closed position, comparing the fourth data to the second proximity threshold.

6. The method of claim 3, further comprising:
receiving a first capacitance from the proximity sensor;
determining to adjust the first transmission power based at least in part on the first capacitance and the first proximity threshold;
receiving a second capacitance from the proximity sensor; and
determining to adjust the second transmission power based at least in part on the second capacitance and the second proximity threshold.

7. The method of claim 3, further comprising:
receiving, from the first sensor, infrared (IR) data indicating the cover is in the closed position, the IR data being output by a component of the cover; and
based at least in part on the IR data, comparing the fourth data to the second proximity threshold.

8. The method of claim 3, further comprising:
receiving, from the first sensor, ambient light data indicating the cover is in the closed position; and
based at least in part on the ambient light data, comparing the fourth data to the second proximity threshold.

9. The method of claim 3, further comprising:
receiving, from the first sensor, magnetic field data indicating the cover is in the closed position, the magnetic field data being output by a component of the cover; and
based at least in part on the magnetic field data, comparing the fourth data to the second proximity threshold.

10. A device, comprising:
at least one processor;
a first sensor in communication with the at least one processor;
a proximity sensor in communication with the at least one processor; and
at least one memory comprising instructions that, when executed by the at least one processor, cause the device to:
receive, from the first sensor, first data corresponding to a first position of a cover disposed on the device;
receive second data from the proximity sensor;
based at least in part on the first data indicating the first position is an open position, compare the second data to a first proximity threshold;
transmit a first wireless communication signal at a first transmission power based at least in part on the first proximity threshold;
receive, from the first sensor, third data corresponding to a second position of the cover;
receive fourth data from the proximity sensor;
based at least in part on the third data indicating the second position is a closed position, compare the fourth data to a second proximity threshold, the cover being at least partially disposed over a display of the computing device while in the closed position; and
transmit a second wireless communication signal at a second transmission power based at least in part on the second proximity threshold.

11. The device of claim 10, wherein
the second proximity threshold is greater than the first proximity threshold.

12. The device of claim 10, wherein the at least one memory further comprises instructions that, when executed by the at least one processor, further cause the device to:
receive, from a second sensor of the device, fifth data corresponding to the second position; and
based at least in part on the third data and the fifth data indicating the second position is the closed position, compare the fourth data to the second proximity threshold.

13. The device of claim 10, wherein the at least one memory further comprises instructions that, when executed by the at least one processor, further cause the device to:
receive a first capacitance from the proximity sensor;
determine to adjust the first transmission power based at least in part on the first capacitance and the first proximity threshold;
receive a second capacitance from the proximity sensor; and
determine to adjust the second transmission power based at least in part on the second capacitance and the second proximity threshold.

14. The device of claim 10, wherein the at least one memory further comprises instructions that, when executed by the at least one processor, further cause the device to:
receive, from the first sensor, infrared (IR) data indicating the cover is in the closed position, the IR data being output by a component of the cover; and
based at least in part on the IR data, compare the fourth data to the second proximity threshold.

15. The device of claim 10, wherein the at least one member further comprises instructions that, when executed by the at least one processor, further cause the device to:
  receive, from the first sensor, ambient light data indicating the cover is in the closed position; and
  based at least in part on the ambient light data, compare the fourth data to the second proximity threshold.

16. The device of claim 10, wherein the at least one memory further comprises instructions that, when executed by the at least one processor, further cause the device to:
  receive, from the first sensor, magnetic field data indicating the cover is in the closed position, the magnetic field data being output by a component of the cover; and
  based at least in part on the magnetic field data, compare the fourth data to the second proximity threshold.

* * * * *